Patented Apr. 8, 1952

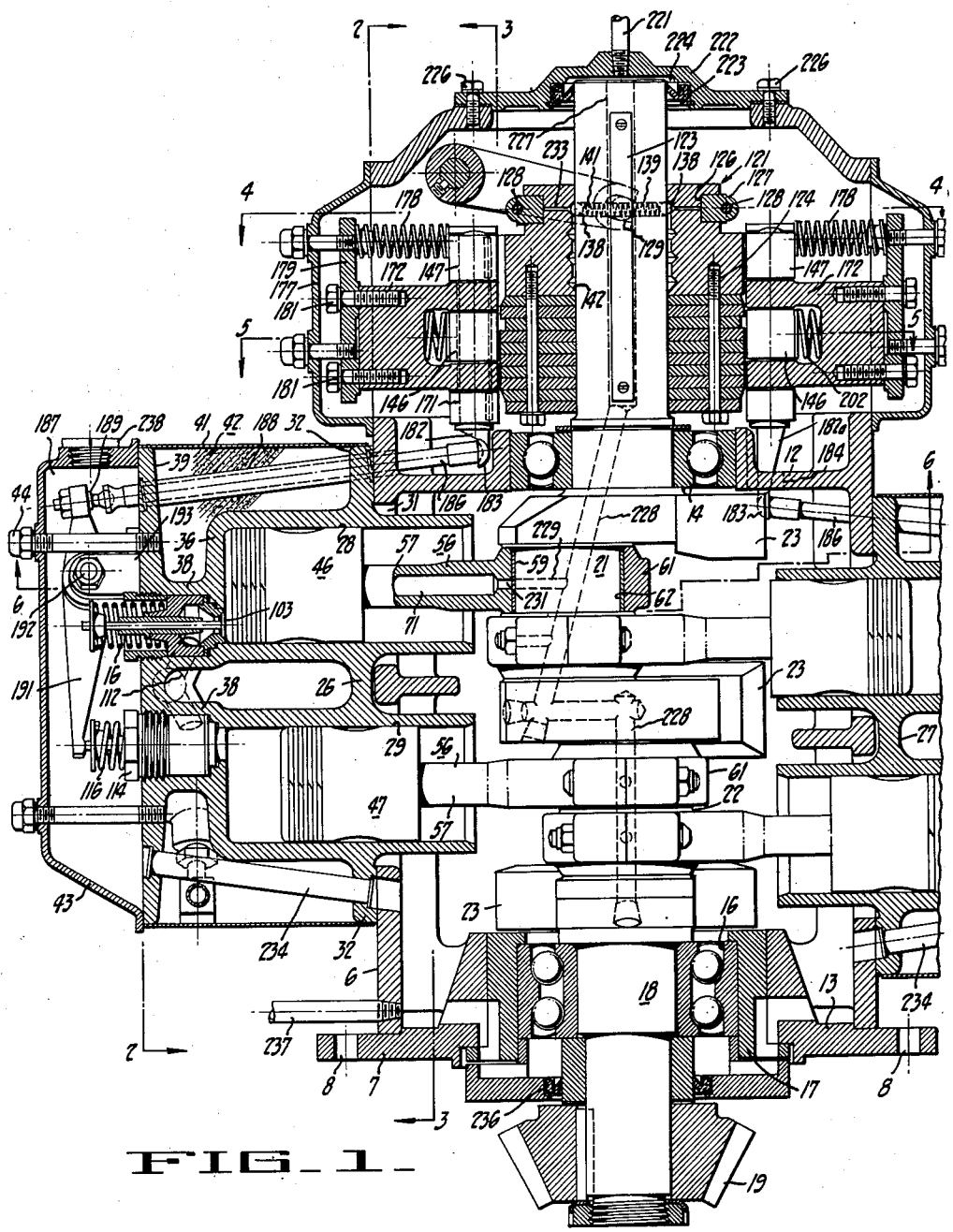
FIG_1_

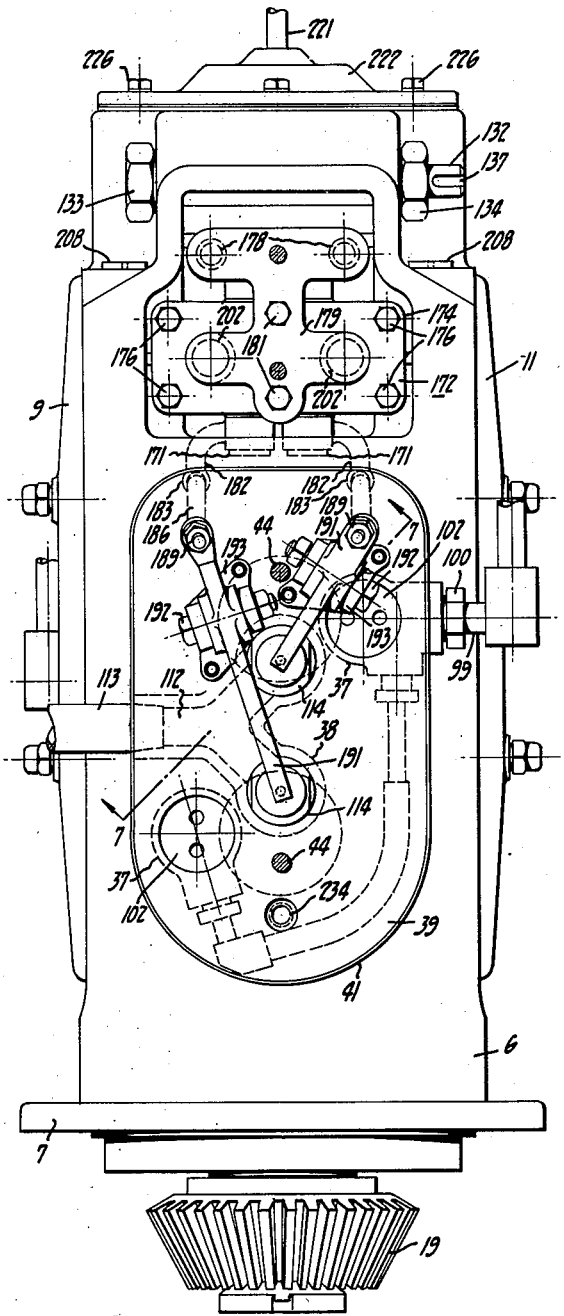
FIG_2_

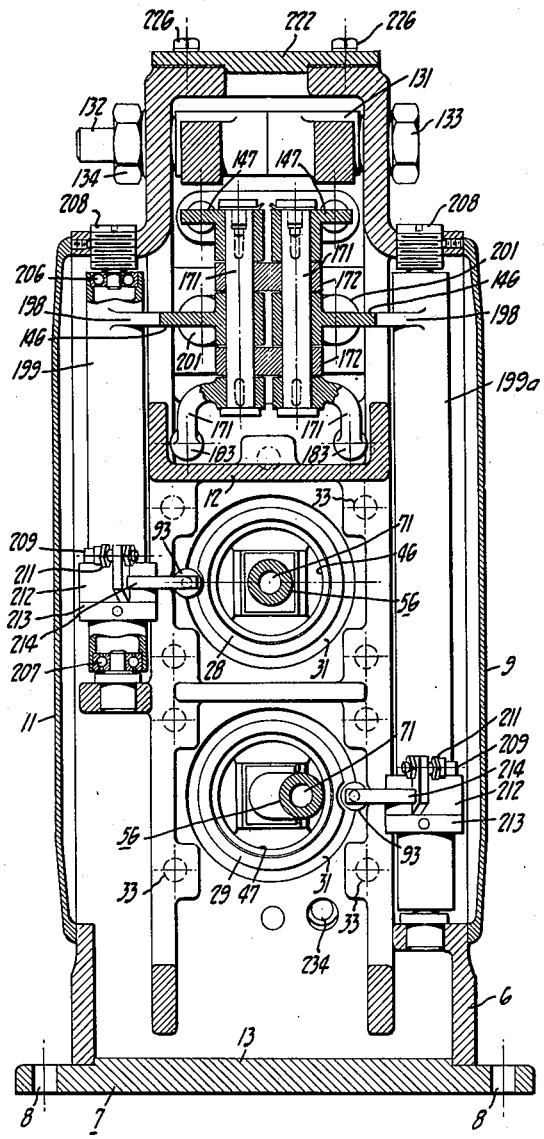
FIG_3_

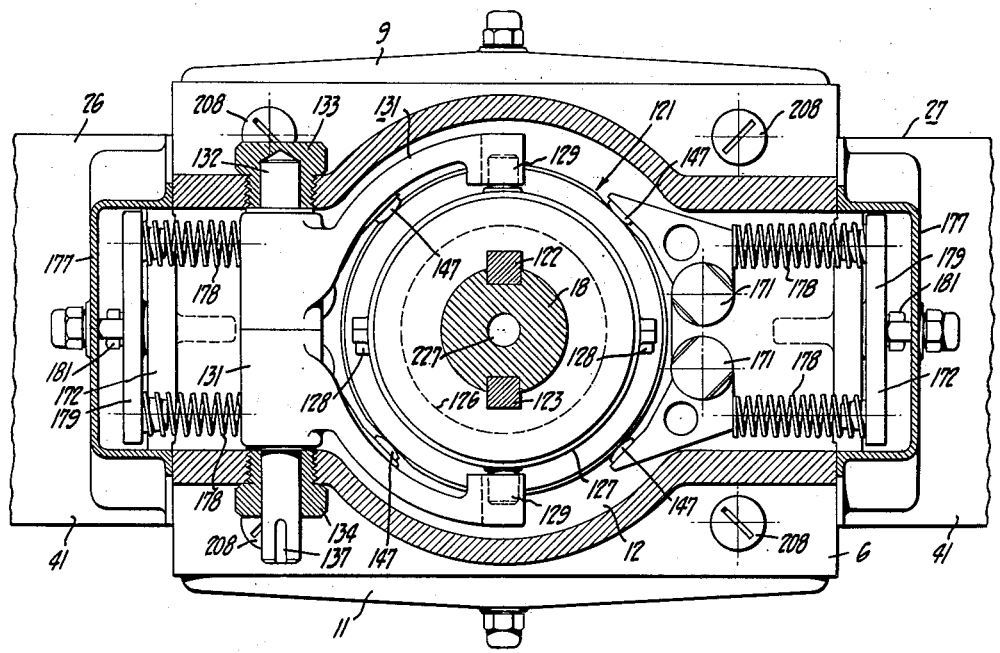

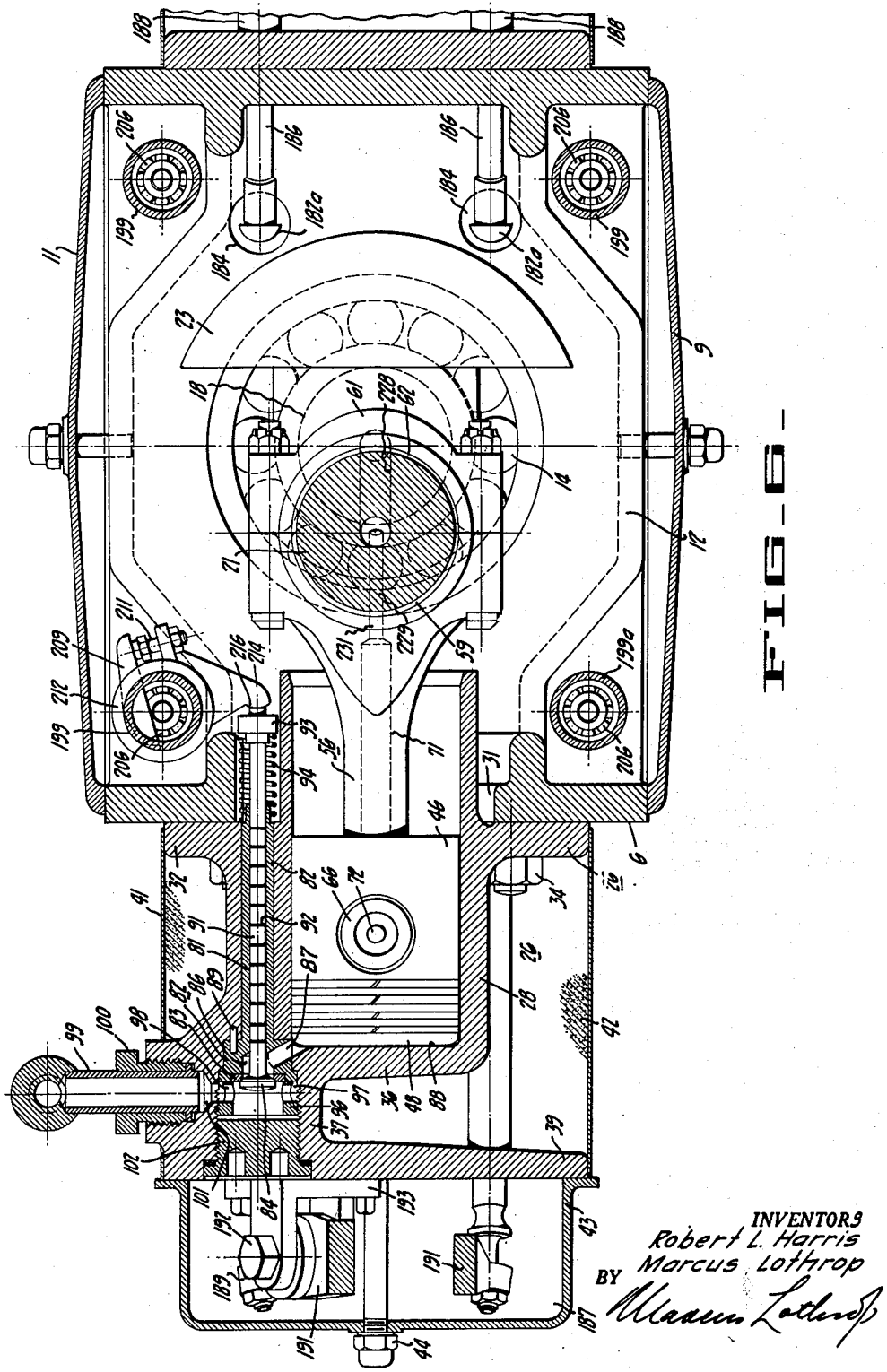

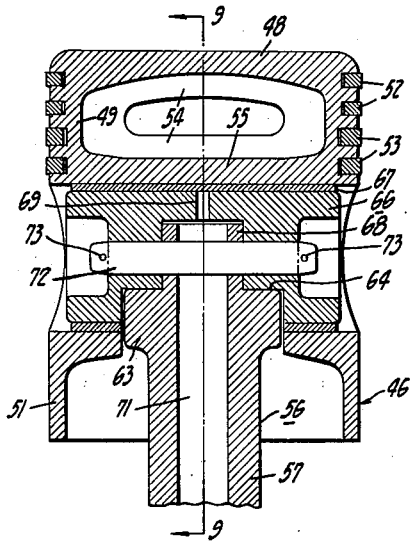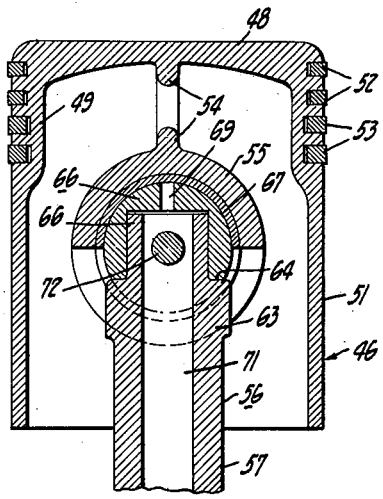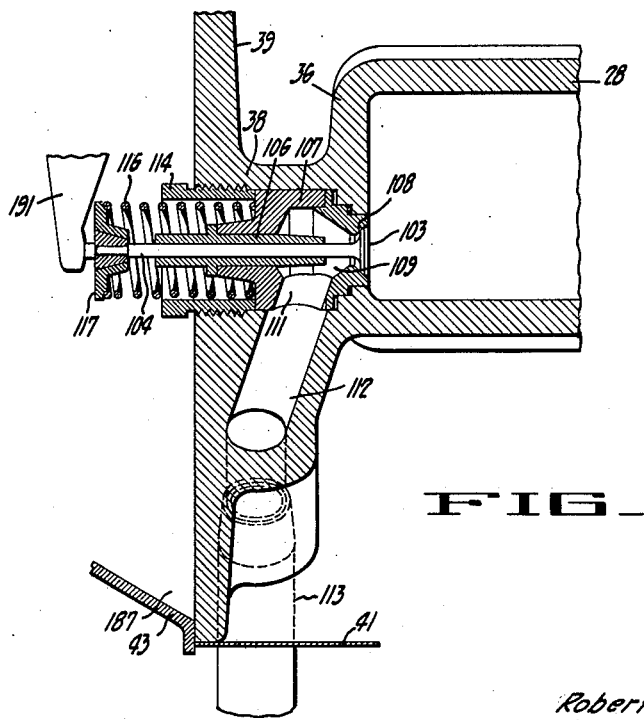

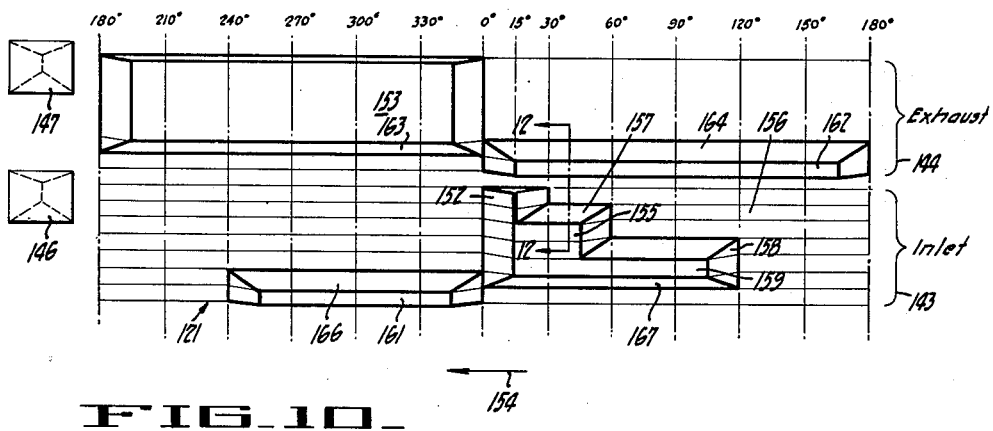
FIG_10_
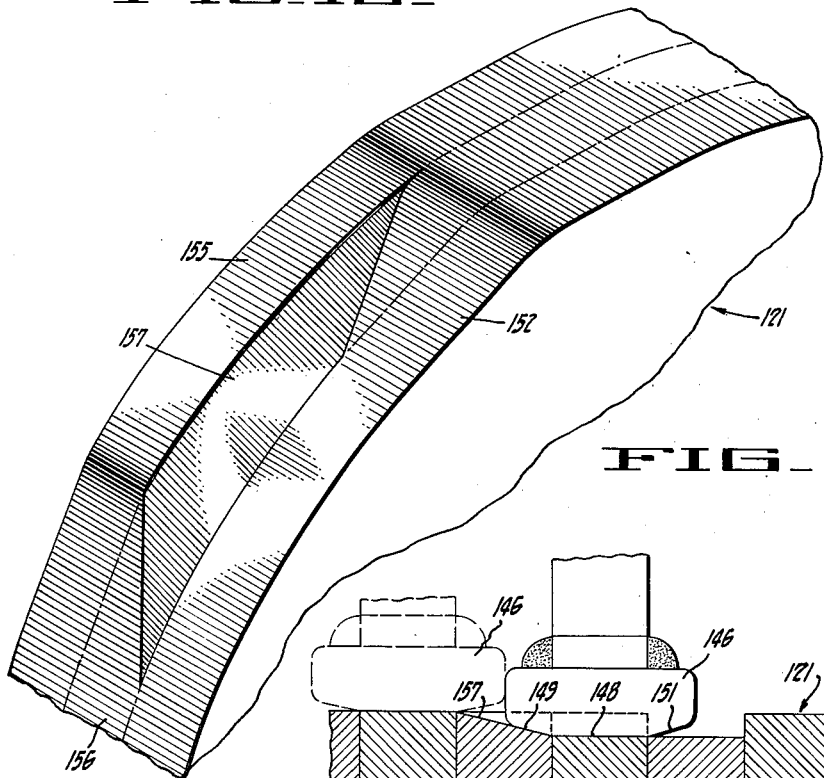
FIG_11_
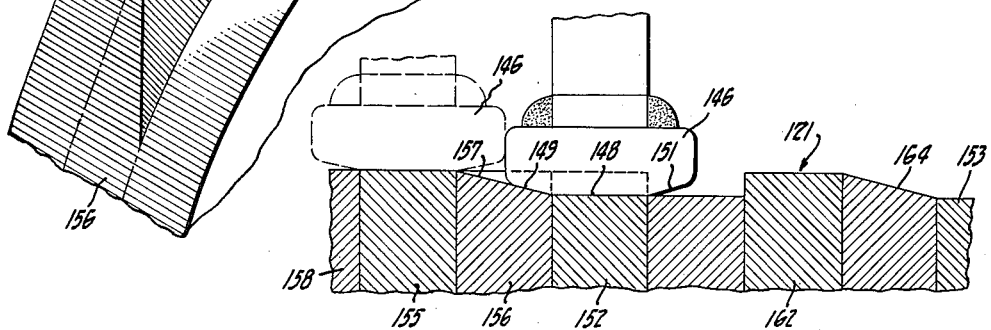
FIG_12_
INVENTORS
Robert L. Harris
Marcus Lothrop
BY
*Marcus Lothrop*

2,591,933

UNITED STATES PATENT OFFICE 2,591,933

STEAM ENGINE HAVING A UNITARY VALVE ACTUATOR

Robert L. Harris and Marcus Lothrop, Berkeley, Calif., assignors to Yuba Manufacturing Company, San Francisco, Calif., a corporation of California Application October 4, 1948, Serial No. 52,662

9 Claims. (Cl. 121—127)

Our invention relates to expansion engines for operating upon a gaseous medium and is especially concerned with steam engines.

While steam engines have been known for many years and have been varied in construction over wide limits, they have lost favor in competition with internal combustion engines, especially in the automotive field and have become so obsolescent that their virtually standardized construction, mode of operation and servicing are largely unrecognized by the present generation of mechanics. That has been partly due to the relatively low efficiency of many steam engines and partly due to the failure to take advantage of progressive manufacturing and operating techniques and more recently developed materials. It has also been partly due to the fact that steam at relatively higher pressures and temperatures has not come into widespread use for reciprocating or relatively small, flexible engines, being confined almost entirely to large turbines.

Most reciprocating steam engines can be classified in a few categories, one of which includes multiple expansion engines usually double acting and provided with some sort of sliding valve gear. Another category includes engines of the so called "uniflow" type patterned on the designs of Stumpf in which poppet valves are sometimes used and in which the engine is usually double acting.

A further category is made up of engines having special valve gears such as the Corliss valve gear and in which the engines are usually double acting and are compounded.

A still further category is a small one but is represented by engines developed by Serpollet. These were single acting, poppet valve engines specially used in connection with vehicles, and the concern herein is with engines generally of this category. The requirements in a vehicle steam engine for starting from cold (when the operating fluid may be largely liquid gradually changing into steam), for quick reversal, and for reversal at relatively high speeds, for little or no operator supervision, for freedom from general maintenance and upkeep over and above that which is normally customary in connection with internal combustion engines have led to the steam engine illustrated herein.

Since there are for certain purposes inherent advantages in a reciprocating engine, it is therefore an object of our invention to provide such an engine in an improved and more modern form.

A further object of the invention is to provide a steam engine which is closely akin to internal combustion engines, both in mechanical technique and in some of its mode of operation.

A further object of our invention is to provide a steam engine especially adaptable to vehicular use.

A further object of the invention is to provide a steam engine which can be manufactured without special manufacturing techniques, that is, with the same machinery and equipment utilized in internal combustion engine manufacture and one which will be recognizable to an internal combustion engine mechanic.

A further object of the invention is to provide a steam engine of good efficiency in comparison with internal combustion engines.

A still further object of the invention is to provide a steam engine capable of operating under widely varying ambient conditions without substantial supervision on the part of the operator or user.

A further object of the invention is to provide a steam engine effective to operate at relatively high speeds or to produce relatively high power for its size and weight.

Other objects together with the foregoing are attained in the embodiment of the invention described in the accompanying description and illustrated in the accompanying drawings in which Figure 1 is in general a transverse cross-section on a vertical plane showing a steam engine of our invention as developed for use on a vehicle, for example a tractor, in which the major axis or crankshaft axis of the engine is vertical.

Figure 2 is for the most part a side elevation of the engine shown in Figure 1, portions, however, being in cross-section, the planes of which are indicated by the lines 2—2 of Figure 1.

Figure 3 is a cross-section, the planes of which are indicated by the lines 3—3 of Figure 1.

Figure 4 is a cross-section to a larger scale than the preceding figures, the plane of section being indicated by the line 4—4 of Figure 1.

Figure 5 is a cross-section to the same scale as Figure 4, the plane of section being on the line 5—5 of Figure 1.

Figure 6 is a cross-section on an enlarged scale, the plane of section being indicated by the line 6—6 of Figure 1.

Figure 7 is a detail of an exhaust valve and its environment, the plane of section being indicated by the line 7—7 of Figure 2.

Figure 8 is an enlarged cross-section of a piston and its connection.

Figure 9 is a cross-section of the piston, the plane of section being indicated by the line 9—9 of Figure 8.

Figure 10 is a diagram of the main cam in developed form, the raised portions of the cam being shown isometrically.

Figure 11 is a fragmentary isometric view of a portion of the cam.

Figure 12 is an enlarged detail of the cam and a follower shown in cross-section, the plane of which is indicated by the line 12—12 of Figure 10.

While the engine of our invention is capable of embodiment in numerous different forms, especially with varying numbers of cylinders, and in different sizes depending largely upon the output required and its environment in use, it is illustrated herein as it is embodied in a form for vehicular use in which the engine is required to operate in both directions and at a speed in the neighborhood of 2000 R. P. M. and to develop approximately 50 horsepower with steam nominally at 1500 lbs. per square inch pressure and 900 degrees Fahrenheit temperature.

In this embodiment, the engine includes a crankcase 6 (Fig. 1) having a lower flange 7 provided with apertures 8 for the reception of fastenings to secure the crankcase to a suitable support (not shown), such as a driving gear case on which the engine is removably mounted. The crankcase is provided with a pair of removable side covers 9 and 11 (Fig. 2) affording access to the interior thereof and is traversed by an upper bearing wall 12 (Fig. 1) and a lower bearing wall 13. Mounted in these walls are anti-friction bearings 14 and 16 removable axially of the crankcase and seated normally in the position shown with the upper bearing capable of slight axial adjusting movement and the lower bearing 16 anchored within a removable bearing cage 17.

Adapted to be mounted in the bearings and to be installed by an axial motion with respect to the crankcase is a crankshaft 18 at its lower end carrying a drive gear 19 designed to mesh with a driven gear, not shown, for receiving the power output of the engine. Between the bearings 14 and 16, the crankshaft in the present instance, since the engine has four cylinders arranged in two pairs on opposite sides of the crankshaft, is provided with two throws 21 and 22 disposed at 90 degrees to each other or "quartered" and related to the remaining part of the shaft by counter-balanced crank cheeks 23.

Mounted on the crankcase at either side of the crankshaft and on faces at right angles to the cover plates 9 and 11 are cylinder blocks 26 and 27, respectively (Figs. 1 and 6). These cylinder blocks are substantially identical except for their positioning on the crankcase, which involves an axial displacement along the length of the crankshaft, and apart from the positioning of some of their fittings. The description of one, therefore, applies equally to the other. The cylinder block 26, for example, is preferably an integral casting including a pair of cylinder sleeves 28 and 29, each being of sufficient length to extend through an aperture 31 in the crankcase and into the interior thereof to terminate just short of the path of revolution of the crank cheeks 23. Projecting from the sleeves 28 and 29 is an integral flange 32 adapted to abut the exposed face of the crankcase and being provided with apertures 33 through which fastenings 34 extend removably to secure the cylinder block to the crankcase. The cylinder sleeve 28 is converged to provide an integral cylinder head 36. A pair of valve bosses 37 for the inlet valve and 38 for the exhaust valve join the cylinder head to a head flange 39 outstanding from the cylinder block and approximately parallel to the flange 32 and of the same envelope or exterior contour as the flange 32. Encompassing the two flanges 32 and 39 is a lagging cover 41 of a light sheet metal capable of confining in the various recesses and contours of the cylinder block an insulator or lagging 42, for example spun glass or glass fibers. The lagging cover 41 is held against axial displacement at one end by the crankcase and at the other end by the overhanging portions of a head cover 43 attached to the cylinder block by removable fastenings 44.

Adapted to reciprocate in the cylinder sleeve 28 and in the cylinder sleeve 29 are pistons 46 and 47. Since these pistons are identical and are the same as the other pistons utilized in the engine, a description of one applies equally to the others. The pistons are of the trunk or single acting type, as especially illustrated in Figures 8 and 9, and are of the type generally used in internal combustion engines. They are somewhat stronger in some parts of the structure, but in accordance with general practice, each includes a piston head 48 joined through a ring area 49 to a piston skirt 51. Piston rings 52 and 53 are of various sorts to control the lubricating oil flow and distribution along the walls of the cylinder sleeve and also to preclude as much as possible the leakage of steam from the cylinder. Reenforcing walls 54 within the piston afford a rigid interconnection between the head 48 and a piston pin tube 55 which spans the piston diametrically but is centrally interrupted throughout a semi-circular portion.

In order to join the piston 46, for example, to its appropriate throw on the crankshaft 18, there is provided a connecting rod 56. This rod is like the other rods utilized in the engine and includes a central tubular portion 57 at one end enlarged to afford a backing for a half 59 of an anti-friction bearing and a securing location for a rod cap 61, itself holding the other half 62 of the anti-friction bearing. While the crankshaft end of the connecting rod is substantially the same as customary internal combustion engine practice, the piston end is somewhat different. The outer end of the rod 56 is provided with a rectangular enlargement 63 adapted to abut a flat face 64 milled in a wrist pin 66 seated within the boss 55 for oscillatory motion. A cut-out, tubular bearing lining 67 reduces the friction of such relative motion. The connecting rod 56 beyond the enlargement 63 terminates in a cylindrical boss 68 fitted into a comparable recess in the center of the pin 66. A passageway 69 affords free communication between the interior bore 71 of the tubular connecting rod 56 and the anti-friction bearing 67.

To hold the connecting rod 56 and the pin 66 in assembled relationship, a securing rod 72 is passed through the center of the wrist pin 66 and through a cross bore in the boss 68, these members being very closely aligned upon assembly. The pin or rod 72 is pushed or forced into place and is finally held by cotter keys 73 in its centralized position. With this arrangement there is provided a continuous bearing surface over the entire top half of the wrist pin 66 to withstand the pressure of the steam exerted upon the piston head 48 so that the unit bearing pressures on the pin are considerably less than they would be were the pin interrupted to receive a complete boss on the end of the connecting rod 56 in accordance with usual practice. In addition to reducing the bearing load by this construction, the assembly and disassembly of the parts is not complicated.

Because of the operating conditions usually encountered in a vehicle and in order to maintain the efficiency at a high level, the clearance or compression volume within the cylinder is reduced as much as is feasible. It is necessary in a vehicular engine to start and operate the engine in either direction and with substantially no supervision. Under initial starting conditions when the parts are cold even though superheated steam may leave the controlling throttle, part of it condenses before it is discharged from the using cylinder and the resulting liquid inside the cylinder forms an absolute barrier to piston motion in the event the liquid cannot readily escape. While relief valves have often been provided, and while a large compression or clearance volume is effective in reducing difficulties due to trapped water, it is advisable for economy's sake to reduce the clearance volume and to provide some other means for permitting the trapped water to escape before damage can be done either to the cylinder or to the piston or to other parts of the engine. Furthermore, since in vehicular service the load varies from nothing at all or nearly nothing to the maximum and even to considerable overload, it appears futile to design an engine with a set compression stroke or compression volume for the alleged purposes of economy. Although Stumpf in his work on uniflow engines attempts to show the benefits of compression upon engine economy, other authorities point out that compression is not necessarily of benefit to the thermal efficiency of the engine. Because of the type of service encountered and because economy appears to be doubtfully achieved, the clearance volume in the present engine has been reduced not only by ordinary expedients but also by the positioning and type of the valving.

In the present instance, especially as shown in Figure 6, the cylinder sleeve 28, for example, and the head 36 are made somewhat asymmetrical so that the inlet valve boss 37 is offset from the central axis of the cylinder and in fact its own axis overlies the outer sleeve wall. Passing axially through the cylinder block parallel to the cylinder axis is a valve bore 81 which in the disassembled block extends entirely through the block from the outer flange 39 to the inner flange 32. The bore is of varying diameter at different locations in its length. Near the cylinder head 36 the bore is of a diameter snugly to accommodate a combined valve seat and guide sleeve 82. This member provides an insert valve seat ring 83 of resistant material against which the head 84 of a poppet valve can be tightly closed. Beneath the head of the valve, the member 82 is formed with a passageway 86 joined to an aperture 87 leading to the interior of the cylinder sleeve. The cross-sectional area of the chamber 86 and of the passage 87 is made as large as is necessary for reasonable gas velocities and for fluid passage but is made as small in volume as is feasible in order to reduce the amount such volumes add to the clearance space 88 between the head 48 of the piston and the interior of the head 36 of the cylinder block. The body 82 is prevented from rotating in its position in the cylinder block by an aligning pin 89 and extends throughout the bore 81 and projects slightly beyond the inner flange 32. The valve sleeve 82 is a lapped fit with the valve stem 91 which also has packing grooves 92 formed in it at appropriate intervals. The lower end of the valve stem is provided with a keeper 93 so that a return spring 94 is confined between the valve stem guide sleeve 82 and the keeper normally to urge the valve 84 onto its seat.

In order that the valve and its seat and stem sleeve can form a separate subassembly for close manufacturing tolerances yet can readily be held in assembled position, the outer end of the inlet valve bore is internally threaded to receive a securing nut 96 adapted to be screwed into abutment with the valve seat member 82 by an internal wrench. The nut 96 is provided with a peripheral clearance 97 and radial holes 98 so that steam can flow past or through the nut from a steam pipe 99 removably fixed in the cylinder block by a nut 100. Communication is established between the pipe 99 and the interior of the nut 96 by a passage 101 in the cylinder block. A final closure of the inlet steam passageway is afforded by a closure plug 102 screwed into position by a special wrench and seating tightly with an appropriate gasket to preclude leakage.

The poppet valve 84 is operated at appropriate intervals to establish communication between the steam pipe 99 and the interior of the cylinder sleeve. The valve being an unbalanced valve is normally urged toward closed position by steam pressure within the pipe 99. Leakage along the stem of the valve is precluded as much as possible by the lapped fitting of the parts and by the packing grooves or by other suitable packing if necessary in extreme cases. In any case, the leakage along the valve stem is due only to the difference between the momentary cylinder pressure and the atmosphere which under usual circumstances is less than the normal operating pressure within the pipe 99. Furthermore, and of great importance during the starting of the engine when cold, is the fact that the unbalanced poppet valve opens outwardly of the cylinder volume into the steam pipe 99. In the event that water of substantial amount is condensed or would otherwise be trapped in the interior of the cylinder, it is expelled by the piston through the steam inlet opening by the unseating of the poppet valve 84 which thus acts as a relief valve. Truly enough, such unseating of the valve is perhaps out of time with the general operation of the engine, but the effect is momentary since the spring 94 and pressure within the duct 99 tend quickly to restore the valve to its seat so that it can operate regularly in the engine cycle. In any event, the poppet valve provides not only its usual functions but acts further as an emergency relief valve for otherwise trapped liquid. It, therefore, assists not only in permitting omission of the clearance volume of the engine usually provided for condensate but also is located sufficiently close to the cylinder volume and is of sufficiently small compass in itself to permit the utilization of an extremely small clearance space thereby adding to the engine economy.

Also effective in connection with the interior of the cylinder is an exhaust valve 103 (Fig. 7). This is also a poppet type valve and in order to permit the clearance volume to be maintained at a small value and in order not to necessitate the provision of additional volume for valve operation, the valve 103 is located in the cylinder head 36 with its axis slightly displaced from the axis of the cylinder and disposed as far as possible from the inlet valve so as to lessen heat conduction therebetween. The exhaust valve is provided with a stem 104 slidably seated in a guide 106. A cage 107 serves as a mounting for the guide 106 and is continued to provide a special valve seat 108 of material well able to resist high temperatures. Formed in the cage 107 is an interior passageway 109 leading from the valve seat 108 and through a side opening 111 to an exhaust duct 112 cast or formed integrally with the cylinder block itself and leading to an exhaust pipe 113 removably attached to the block. The cage 107 is removably held in location by a sleeve nut 114 threaded into the cage bore in the exhaust boss in the cylinder head. A spring 116 abuts the cage 107 at one end and at the other is secured to the stem 104 by a keeper 117 so that normally the exhaust valve is urged toward its seat.

The motion of the exhaust valve is axial and in the same alternate directions as is the motion of the piston 46. Since there is as little as possible clearance volume at the end of the piston stroke, the motion of the valve 103 is timed so that although the valve opens into the same volume that at one time in the cycle is swept by the piston, it retreats or withdraws just in advance of the movement of the piston and seats or substantially seats at the time the piston is closest the cylinder head. While very little clearance exists between the closing exhaust valve and the piston as it reaches the end of a stroke, still the exhaust valve does not require especial clearance volume for its opening movement since it utilizes the swept volume of the cylinder. In this way, the amount of clearance volume is not increased by the exhaust valve and the thermal economy of the engine is maintained.

Because of the widely varying duty of the engine, that is, the necessity for operating it under very light loads as well as heavy loads even overloads and for operating it in either direction at will, the valving arrangement is especially provided to afford not only the reversing function of the engine but also some variation in the cut-off point of the steam admission portion of the cycle. While from theoretical considerations it is advisable to vary the cut-off point of the engine in accordance with the pressure of the incoming throttled steam or in accordance with load upon the engine or in accordance with some other continuously variable factor or factors, it does not seem to be feasible to provide such an arrangement in an engine which must operate with very little supervision and which varies in its output widely in a very short time. It therefore seems permissible to compromise with the theoretical requirement by providing a fixed number of cut-off positions in the engine. In the present instance, the valve gearing is arranged so that there are three different cut-off positions for forward motion of the engine and but a single cut-off position for the reverse motion of the engine although, depending upon the duty normally required, the number of positions either in forward or reverse operation can be increased or decreased still following out the general scheme disclosed herein.

As especially illustrated in Figure 1, the end of the crankshaft opposite the take-off drive gear 19 is extended axially to provide a mounting and support for a cam 121. The cam is mounted on the crankshaft for ready axial sliding movement but is precluded from turning with respect to the crankshaft by a pair of diametrically opposed keys 122 and 123. The cam and its attendant mechanism are housed in the upward extension of the crankcase so that the camming mechanism for all of the cylinders in the engine is provided on the crankshaft itself rather than by a separate cam shaft and is all concentrated at one end of the crankshaft rather than being distributed along the crankshaft, and furthermore is accomplished by one cam element such as 121 rather than by a separate cam element for each cylinder.

While the cam 121 can be made in a single piece, it is preferably fabricated in a number of different sections all held together by through fastening screws 124. One of the parts of the cam is the axial shifting portion and that comprises a collar formed by an inturned groove 126 in which a relatively rotatable collar 127 (Fig. 4) is disposed. The collar is in two pieces held by fasteners 128 for ease in assembly and is provided with a pair of diametrically extending shifter pins 129 engaged by the bifurcated ends of a two-part shifter fork 131. This fork is secured to a shift shaft 132 carried in journal nuts 133 and 134 screwed into a reduced portion of the upper part of the crankcase. A key connection 137 at one end of the shifter shaft is provided with a control mechanism (not shown) so that upon rotation of the shaft and oscillation of the fork 131, the collar 126 is also moved axially of the crankshaft and carries the cam 121 with it. The precise position of the cam along the crankshaft is established in part by the shifter fork but the final centralization is accomplished by a pair of balls 138 disposed in a cross bore 139 in the crankshaft and urged outwardly by a spring 141 into the adjacent one of a plurality of internal grooves 142 axially spaced along the interior of the cam. During operation of this structure, the force of the spring 141 which normally presses the balls to serve as detents against motion of the cam increases by centrifugal action so that at the higher engine speeds, it becomes more difficult to displace the cam axially. The amount of this force can readily be regulated, so that if desired, it becomes impossible manually to shift the cam accidentally or even purposely at extremely high engine speeds, thereby affording a safety measure against reversal of the engine under adverse conditions. In a proper case, the cam is readily shifted into any one of the four positions herein provided.

The four cam positions are arbitrarily chosen as a reverse position and three forward positions. The cam is made to accommodate the valve linkage for the inlet valves and for the exhaust valves. It is also contoured in order to facilitate ready shifting of the cam from one position to another at the control of the operator.

As diagrammatically illustrated in Figures 10, 11 and 12, the cam is a drum which when developed as shown in Figure 10 is provided with an intake portion or band 143 preferably made up of a number of individual cam discs and also an exhaust band or portion 144 similarly made up. The intake portion is designed to cooperate with an intake follower 146 and the exhaust portion to cooperate with an exhaust follower 147 (Fig. 5). While these followers are shown somewhat diagrammatically in Figures 10 and 12, each of them actually includes a generally radial movable portion having a central cam following face 148 which is arcuate in the perpendicular plane of the cam or is tapered or beveled in that direction. Furthermore, the follower is provided at opposite sides of its centrally flat axial contour with inclined portions 149 and 151 respectively. The follower is not only capable of a generally radial movement with respect to the cam but likewise can be externally moved axially of the cam, the follower being restrained only against rotation with the cam itself in either direction. Additionally, the intake follower 146 and the exhaust follower 147 are arranged to have a fixed axial spacing and to be moved relative to the cam as a pair maintaining such spacing. In the present instance, the followers themselves do not move axially with respect to the remainder of the engine but the cam itself is so moved although the other arrangement for obtaining the relative motion operates in substantially the same way.

In the relative position of the parts shown in the developed view, Figure 10, the inlet and exhaust followers 146 and 147 are respectively in the path of motion of the forward short cut-off inlet cam 152 and the corresponding forward exhaust cam 153. In this position of the parts, when the cam rotates in the direction of the arrow 154 during forward movement of the engine, as the cam 152 underrides the follower 146, the follower is moved in a radial direction due to the contact of the axially flat surface of the cam with the axially flat central portion 148 of the follower. The side extensions 149 and 151 of the follower take no part in such action merely clearing the surrounding structure. The contour of the inlet cam 152 is such that it has substantially tangential ramps and a very short dwell so that the cut-off of the inlet steam caused by this cam contour is extremely short, for example ten per cent of the stroke. The exhaust cam 153 is positioned and arranged so that it also has a portion underriding the exhaust cam follower 147 in its flat portion, and the duration of the exhaust stroke is substantially 180 degrees even though the cut-off is quite short.

When it is desired to shift the cut-off to a longer duration and without changing the direction of rotation of the engine, the cam 121 is shifted axially with respect to the followers 146 and 147 so that eventually the followers override or are underridden by an intermediate cut-off cam 155 and a corresponding portion of the exhaust cam 153. The cam 155 is identical with the cam 152 except that its ramps are farther apart so that the central dwell is longer, affording a cut-off of forty per cent, for example. Since the exhaust duration is still substantially 180 degrees, the exhaust cam 153 is not changed in contour but is merely of sufficient width so that a different portion of it when shifted underrides the exhaust follower 147. Furthermore, since the exhaust cam is identical in the axial direction, there is no necessity for utilizing any especial means for facilitating the axial shift. But since the cam 155 is not identical with the cam 152, means are provided for facilitating the axial shift of the cam from one position to the other.

For that reason, between the cams 152 and 155, there is a transition cam 156, as shown to an enlarged scale in Figure 11, in which the cam is contoured not only in the peripheral tangential direction of the cam but also in the axial direction to provide a side ramp 157 substantially as shown also in Figure 12. This side ramp is effective upon one of the side ramps, for example 149 of the cam follower 146. Thus, from any position, the cam 121 can be moved axially so that the follower is cammed by such axial movement from a radially inward position to a radially outward position or vice versa. During this momentary transition operation, the exact timing of the inlet stroke is not precise but may occur so as to afford a cut-off of any value between say ten per cent and forty per cent. Although the value is indeterminate, it is within fixed limits and happens only for a few cycles at most in the operation of the engine. The provision of the lateral or side ramps precludes undue difficulty in axial shifting of the cam and precludes point contacts in the cam mechanisms to reduce wear. Since in all normal operation flat faces or substantially flat faces of the cams and followers abut, there is normally broad line contact of the surfaces.

In a similar fashion, there is provided a transition section 158 between the intermediate cut-off cam 155 and a long cut-off cam 159. This latter has substantially the same shape ramps as the preceding cams but has a longer dwell so that the resulting cut-off is of the order of sixty per cent, for example. Since the exhaust stroke is still of about 180 degrees duration, the exhaust cam 153 does not vary and does not require any transition section or axial ramps. For the forward motion of the engine therefore, the cam 121 is shifted with respect to the followers 146 and 147 into any one of three positions as centralized by the balls 138 and a three-step approximation of the theoretically desired cut-off characteristics is obtained.

In order that the engine may be reversed, the cam 121 is provided both with an inlet reverse cam 161 and an exhaust reverse cam 162. The latter cam is of the same envelope curvature as the cam 153 but is displaced 180 degrees from it. Furthermore, a transition lateral ramp 163 is provided on the cam 153 and a somewhat comparable ramp 164 is provided on the cam 162. In a similar fashion, the cam 161 is of the same general envelope curvature as the forward long cut-off cam 159, although it can vary therefrom if desired. It is provided with a transition ramp 166, while the cam 159 is provided with a lateral ramp 167 to facilitate the shift from forward to reverse rotation. The manner of shifting is substantially as has been described in connection with variation in cut-off. It happens, however, that the position of the inlet reverse cam 161 is polarly displaced less than 180 degrees with respect to the peripheral position of the inlet forward cam 159. The fourth position of the cam 121 axially of the crankshaft therefore places the cam in a location with respect to its followers 146 and 147 so that the valve events occur in a proper time and sequence for reverse engine operation.

In order to transmit the action of the followers to the various valves and in order to time the sequence of operations of the various cylinders in the proper way, a valve linkage is interposed between each one of the individual valves and the single cam mechanism. Since the valve linkage is substantially the same for each cylinder there being only minor variations in size and position of some of the parts, a description of one of the linkages applies to the other linkages as well except for small differences in symmetry or location or dimension.

Considering the exhaust valve linkage first, especially as illustrated in Figure 4, each of the followers 147 is fast on or is keyed to a shaft 171 so that the follower and the shaft oscillate together. Each pair of the shafts 171 is mounted for rotation in a bracket 172 (Figures 2 and 3) having flanges 174 overlying portions of the crankcase to which it is detachably secured by fastening screws 176. A removable cover 177 overlies the bracket and its attendant shafts and exhaust followers so that they can be removed as a unit from their normal operating position. Abutting each of the followers 147 at one end is a coil spring 178, at its other end held in position by a frame 179 itself secured to the bracket 172 by relatively long fastening screws 181. Upon removal of the fastening screws, the tension of the springs 178 is gradually relaxed until the springs are slacked and can be easily removed, while upon assembly the slacked springs are readily brought up to appropriate tension by tightening of the fastening screws 181. There is thus provided a mechanism easily assembled and disassembled and effective strongly to spring press the followers 147 to adhere to the exhaust cam. The pair of followers on one side of the crankcase are in mirror symmetry and are likewise symmetrical with respect to the exhaust followers on the other side of the engine.

Since the short shaft 171 journaled in the bracket 172 is keyed to the follower, it partakes of all of the follower movements and consequently oscillates about its own axis in accordance with the cam contour. At its end opposite the follower, each of the shafts 171 is provided with a radial actuating arm 182 terminating in a cup 183. As illustrated in Figure 1, the arms 182 on one side of the engine are axially displaced only a little, whereas similar arms 182A on the other side of the engine are axially displaced a considerable amount and in fact extend through openings 184 in the crankcase upper wall 12. While the engine is generally symmetrical, the cylinder block on one side is displaced in an axial direction with respect to the cylinder block on the other side since the big or crankshaft ends of the connecting rods are disposed side by side on the crankshaft throws. This requires different offsets in the arms 182 and 182A. The operation of the parts is identical and their assembly and disassembly is virtually the same.

Each of the cups 183 abuts a suitably contoured end on a tubular push rod 186 extending from the inside of the crankcase through the cylinder block to a valve chamber 187 enclosed by the head cover 43. A tube 188 passes through the inner flange 32 and the outer flange 39 of the block and affords a passageway between the interior of the crankcase and the chamber 187 without interfering with the lagging 42. The outer end of the push rod 186 is cupped to engage an adjustable connection 189 at one end of a rocker arm 191. This arm is mounted to oscillate on a fulcrum bolt 192 removably fixed in a mounting fork 193 secured to the cylinder block flange 39. Since the exhaust valves of the two cylinders in each block are axially spaced apart while the push rods for them are in substantially the same axial plane, the rocker arms 191, as shown especially in Figure 2, are of unequal length. To compensate for this, the fulcrum bolts 192 are differently spaced so that an identical valve motion is derived from the cam by both valves. Furthermore, the positioning and connection of a particular rocker arm is such that the appropriate one of the push rods 186 is effective upon the appropriate exhaust valve 103 so that the impulse sequence of the cylinders is proper with regard to the position of the crankshaft throws. The effect of the valve linkage is to produce a motion of the exhaust valve in each cylinder of the proper amount at the proper time as the cam 121 rotates in unison with the rotation of the crankshaft. The general return motion of the valve and linkage is provided not only by whatever effective pressure difference may exist but also by the return springs 116 of the valves and 178 of the valve followers.

To provide for actuation of the inlet valves, a somewhat similar mechanism is afforded and since the linkage going to each of the valves is substantially the same as that going to the other valves, barring slight differences due to location and size, a description of one of them applies equally to the others. For example, as shown especially in Figure 5, one of the inlet followers 146 is mounted for free pivotal or oscillating motion on the shaft 171. The inlet follower 146 is not keyed or fastened on the shaft 171, the motion of which is controlled by an exhaust follower, but simply is mounted upon the shaft 171 as a pivot support. The inlet follower 146 is confined against axial dislodgment since it is disposed between the two forks of the bracket 172. The inlet followers 146 are arranged in mirror symmetry with respect to each other.

Each of the inlet followers 146 is provided with a small boss 196 adapted to bear against a meeting surface 197 on a rocker lever 198 projecting radially from or near one end of a very light rocker tube 199. The outer extremity of the rocker lever 198 is enlarged into a seat 201 for a spring 202 at its outer end abutting a centralizing boss 203 formed on the spring retaining frame 179. Each frame 179 therefore establishes the compression of both exhaust springs 178 and both inlet springs 202 on one side of the engine. The rocker tube 199 is mounted, as shown especially in Figure 3, for oscillation in ball bearings 206 and 207 disposed at the opposite ends thereof and carried by plugs 208 in the crankcase, one of which is removable so that the tube can be withdrawn laterally when the adjacent one of the crankcase cover plates 9 and 11 is removed. The tube 199 extends longitudinally of the crankcase parallel to the crankshaft axis to an appropriate point depending upon the side of the engine it is disposed on. Some of the tubes 199 are relatively short since they go to the uppermost cylinder block, whereas others of the tubes 199A are longer as they go to the lowermost cylinder block. Otherwise, the tubes and their functions are identical.

At an appropriate position on each tube 199, there is provided a fixed radial arm 209 (Figure 6) adapted to abut an adjusting mechanism 211 provided on a sleeve 212 surrounding and journaled upon the tube 199 being confined axially between the radial arm 209 and a locking collar 213. A radial actuating arm 214 on the sleeve 212 is provided with an abutting contour 216 immediately in alignment with the stem 91 of the inlet valve. The adjustment 211 establishes the clearance at this location and in the inlet valve linkage.

As the cam 121 rotates, the inlet portion thereof is effective in sequence upon the various inlet followers 146 which in turn actuate the levers 198 and compress the springs 202. The tubes 199 are oscillated with the levers 198 and correspondingly oscillate the radial arms 209.

These, through the adjustment 211, oscillate the actuating arms 214 and correspondingly translate the inlet valve stems 91 and the valve heads 84. Return movement of the inlet valves is provided in part by differential pressure when available and by the springs 94. The remaining part of the force necessary to return the inlet valve linkage and to make the followers 146 follow the cam 121 is provided by the springs 202. The arrangement of the tubes 199 and of their radial arms 209 is such with respect to the arrangement of the cylinders and the sequence of the inlet cam that the inlet valves are operated in appropriate time and sequence with the rotation of the crankshaft. There is thus provided a pair of valve linkages, one for the exhaust valves and another for the inlet valves, which transmit the impulses afforded by the cam 121 at one end of the crankshaft to the various valves for the cylinders in proper order and time. The linkage is for the most part made up of generally symmetrical or interchangeable members, and the return springs are spaced at different points so that the various portions of the mechanism can be made relatively light to follow the cams at high engine speed. Also in the event of water being trapped in the cylinders, the inlet valves serve as relief valves without affecting the remainder of the valve linkage.

In order that the engine may be appropriately lubricated, it is included in a closed circuit lubrication system not illustrated in detail but from which lubricant, such as oil under pressure, is furnished through a pipe 221 (Fig. 1) entering a cap 222 at the upper end of the crankcase. This cap is provided with a shaft seal 223 to preclude oil leakage from an entering lubricant chamber 224 and is removably secured in place by fastenings 226. Oil from the chamber 224 passes into an axial oil passage 227 drilled in the crankshaft and having variously directed branches 228 throughout most of the length of the shaft, passing through the various throws and crank cheeks. Oil under pressure is led through the crankshaft to radial passages 229 in each of the journals. These communicate periodically or continuously through appropriate passages 231 in the connecting rod bearings with the bore 71 of the connecting rods. Adequate lubricant is thus supplied not only to the wrist pin bearing 67 but also to the journals 59 of the crankshaft and by leakage and splash to the interior walls of the cylinder sleeves 28 and 29. Copious lubrication is thus supplied to the crankshaft and all of its connected parts as well as to the cylinders.

Since the bore 139 in which the spring 141 is disposed likewise intersects the oil passage 227, some oil flows through such passage to the interior of the cam 121 facilitating its sliding motion on the crankshaft and escapes therefrom through small passages 233 to the cam shift collar 127 and by leakage and splash to the adjacent structures. Lubricating oil which is thrown off by the revolving cam adjacent the collar 127 falls over the various cam surfaces and cam followers and their joints as well as the springs. Most of this oil drains by gravity through the region of the crankcase wall 12, and some of it or some of the oil vapor or spray finds its way by gravity through the enclosing tubes 188 for the valve push rods so that oil is carried in liquid or vapor or spray form into the valve chambers 187 wherein it lubricates the various rocker connections and the valves stems. Oil which collects in the valve chamber 187 is carried back into the crankcase by tubular return ducts 234. There is thus provided not only pressure lubrication for the crankshaft and its attachments but also a general bath or splash lubrication for all of the cam mechanism and the valve actuating linkages.

The lubricant which returns from the ducts 234 to the crankcase and that which escapes from the various journal bearings and is drained from the cylinder walls falls by gravity into the lower portion of the crankcase generally around the lower bearing 16. This oil is restrained from further flow along the crankshaft by a shaft seal 236 and is withdrawn from the crankcase through a pipe 237 extending back to the source of oil from whence the pipe 221 proceeds. The outlet pipe 237 is effective to carry oil from the crankcase and also to remove any water of condensation which may have leaked into or become part of the lubricant. The crankcase is normally operated with substantially no body of oil in it according to the "dry sump" system. That is, the oil is removed substantially as fast as it collects in the bottom of the crankcase and is filtered, treated or otherwise processed to remove any excess water. The heat of operation of the engine is often sufficient to drive off unwanted volatile contaminants through vent plugs 238 provided at the upper portion of the covers 43 and thus the engine is well lubricated and ventilated to operate under optimum conditions.

We claim:

1. A steam engine comprising a crankcase, cylinders in line on said crankcase, pistons in said cylinders, a crankshaft in said crankcase, means connecting said pistons and said crankshaft, valves in said cylinders for controlling steam flow, valve linkage extending from said valves to said crankcase, actuating cams mounted on and shiftable along said crankshaft into various positions, and shafts mounted for oscillation in said crankcase parallel to said crankshaft and abutting said cams and said valve linkage for transmitting cam motion to said valves.

2. A steam engine comprising a crankcase, a crankshaft in said crankcase, a plurality of cylinders arranged on said crankcase in alignment axially of said crankshaft, pistons in said cylinders, means connecting said pistons and said crankshaft, valves in each of said cylinders for controlling steam flow, valve linkage extending from said valves to the periphery of said crankshaft adjacent one end thereof, said linkage including shafts mounted for oscillation in said crankcase parallel to said crankshaft, and actuating cams mounted on said crankshaft adjacent one end thereof for engagement with said oscillating shafts.

3. A steam engine comprising a crankcase, a crankshaft in said crankcase, said crankshaft having a plurality of throws, a first pair of cylinders on said crankcase on one side of and in the axial plane of said crankshaft, a second pair of cylinders on said crankcase on the other side of and in said axial plane of said crankshaft, pistons in said cylinders, means connecting said pistons and the throws of said crankshaft to impart piston impulses to said crankshaft in a predetermined sequence, valves in each of said cylinders for controlling steam flow, a common actuating cam mounted on and driven by said crankshaft, and valve linkage connecting said common actuating cam to said valves in each of said cylinders in said predetermined sequence.

4. A steam engine comprising a crankcase, a crankshaft in said crankcase, said crankshaft having two throws at ninety degrees to each other, a first pair of cylinders on said crankcase on one side of and in the axial plane of said crankshaft, a second pair of cylinders on said crankcase on the other side of and in said axial plane of said crankshaft, pistons in said cylinders, means connecting said pistons and the throws of said crankshaft to impart piston impulses to said crankshaft in a predetermined sequence, inlet valves in each of said cylinders for controlling flow of steam into said cylinders, exhaust valves in each of said cylinders for controlling flow of steam out of said cylinders, a common inlet cam mounted on and driven by said crankshaft, inlet valve linkage connecting said inlet cam to said inlet valves in each of said cylinders in said predetermined sequence, a common exhaust cam mounted on and driven by said crankshaft, and exhaust valve linkage connecting said exhaust cam to said exhaust valves in each of said cylinders in said predetermined sequence.

5. A steam engine comprising a crankcase, a cylinder on said crankcase, a piston in said cylinder, a connecting rod on said piston, a crankshaft in said crankcase and engaging said connecting rod to move said piston through a predetermined swept volume in said cylinder, a valve in said cylinder for controlling steam flow, and means operated by said crankshaft for moving said valve into and out of said swept volume.

6. A steam engine comprising a crankcase, a cylinder on said crankcase, a piston in said cylinder, a connecting rod on said piston, a crankshaft in said crankcase and engaging said connecting rod to move said piston through a predetermined swept volume in said cylinder, a poppet valve opening inwardly of said cylinder for controlling steam flow from said cylinder, and means operated by said crankshaft for moving said valve into and out of said swept volume in time with the movement of said piston.

7. A steam engine comprising a crankcase having an opening therein, a cylinder block including a cylinder having a sleeve adapted to extend through said opening into said crankcase, a flange extending from said sleeve and adapted to abut said crankcase, means for securing said cylinder block to said crankcase, a valve stem boss on said sleeve, said boss having a valve stem bore therethrough, a valve in said cylinder for controlling steam flow, a stem on said valve extending through said bore and through said opening into said crankcase, and means in said crankcase and engaging said stem for operating said valve.

8. A steam engine comprising a crankcase, a crankshaft mounted within said crankcase and having a plurality of throws, a plurality of cylinders on said crankcase, pistons reciprocable within said cylinders, connecting rods joining said pistons and said crankshaft throws, valves in said cylinders, a cam on one end of said crankshaft, shafts mounted for oscillation on axes parallel to said crankshaft, means engaging said cam for imparting oscillation to said shafts, and connectors for imparting oscillation of said shafts to said valves.

9. A steam engine comprising a crankcase, a crankshaft mounted within said crankcase and having a plurality of throws, a plurality of cylinders axially spaced along said crankcase, pistons reciprocable within said cylinders, connecting rods joining said pistons and said crankshaft throws, valves in said cylinders, a cam on said crankshaft, shafts mounted in said crankcase for oscillation on axes parallel to said crankshaft, followers engaging said cam for imparting oscillation to said shafts, and connections for imparting oscillation of said shafts to said valves.

ROBERT L. HARRIS.
MARCUS LOTHROP.

REFERENCES CITED

The following references are of record in the file of this patent:

UNITED STATES PATENTS

| Number | Name | Date |
|---|---|---|
| 863,545 | MacLachlan | Aug. 13, 1907 |
| 995,384 | Stanley | June 13, 1911 |
| 1,293,562 | Siegel | Feb. 4, 1919 |
| 1,478,843 | Turnwald | Dec. 25, 1923 |
| 2,009,745 | Riesner | July 30, 1935 |
| 2,051,534 | Skwierawski | Aug. 18, 1936 |
| 2,102,389 | Staley | Dec. 14, 1937 |
| 2,413,751 | Dennis | Jan. 7, 1947 |

FOREIGN PATENTS

| Number | Country | Date |
|---|---|---|
| 162,752 | Germany | Sept. 14, 1905 |
| 101,298 | Sweden | Apr. 8, 1941 |